United States Patent
Ukena-Bonfig et al.

(10) Patent No.: US 10,762,237 B2
(45) Date of Patent: Sep. 1, 2020

(54) METHOD FOR ANONYMIZATION OF DATA COLLECTED WITHIN A MOBILE COMMUNICATION NETWORK

(71) Applicant: Telefónica Germany GmbH & Co. OHG, München (DE)

(72) Inventors: Jonathan Ukena-Bonfig, Munich (DE); Philipp Schöpf, Munich (DE)

(73) Assignee: Telefónica Germany GmbH & Co. OHG, Munich (DE)

(*) Notice: Subject to any disclaimer, the term of this patent is extended or adjusted under 35 U.S.C. 154(b) by 387 days.

(21) Appl. No.: 15/038,903

(22) PCT Filed: Oct. 24, 2014

(86) PCT No.: PCT/EP2014/002875
§ 371 (c)(1),
(2) Date: May 24, 2016

(87) PCT Pub. No.: WO2015/058860
PCT Pub. Date: Apr. 30, 2015

(65) Prior Publication Data
US 2017/0169252 A1    Jun. 15, 2017

(30) Foreign Application Priority Data
Oct. 24, 2013 (EP) .................................... 13005086

(51) Int. Cl.
*H04L 29/06*  (2006.01)
*G06F 21/62*  (2013.01)
(Continued)

(52) U.S. Cl.
CPC ...... *G06F 21/6254* (2013.01); *H04L 63/0421* (2013.01); *H04W 8/16* (2013.01); *H04W 12/02* (2013.01); *H04L 63/0407* (2013.01)

(58) Field of Classification Search
CPC ..................................................... H04W 12/02
See application file for complete search history.

(56) References Cited

U.S. PATENT DOCUMENTS

2010/0064373 A1* 3/2010 Cai ..................... G06F 21/6254
726/26
2011/0010563 A1  1/2011 Lee et al.
(Continued)

FOREIGN PATENT DOCUMENTS

| DE | 10 2010 047117 A1 | 4/2012 |
| DE | 102010047117 A1 * | 4/2012 ......... H04L 63/0407 |

(Continued)

OTHER PUBLICATIONS

Bamba et al, "PRIVACYGRID: Supporting Anonymous Location Queries in Mobile Environments," Internet Citation 2007. pp. 1-16.
(Continued)

*Primary Examiner* — Jason K Gee
(74) *Attorney, Agent, or Firm* — Dilworth & Barrese, LLP

(57) ABSTRACT

The invention relates to a method for anonymization of event data collected within a system or network providing a service for subscribers/customers wherein each event data set is related to an individual subscriber/customer of the system/network and includes at least one attribute wherein the method counts the number of event data sets related to varying individual subscribers having identical or nearly identical values for at least one attribute. The invention further relates to a method for anonymization of static data related to individual subscribers of a mobile communication network wherein each static data set consist of different attributes and the method identifies specific profiles derivable form the static data and drops one or more respective attribute of the static data sets and/or classifies two or more
(Continued)

static data sets to a certain group having at least one matching attribute.

10 Claims, 8 Drawing Sheets

(51) Int. Cl.
*H04W 8/16* (2009.01)
*H04W 12/02* (2009.01)

(56) References Cited

U.S. PATENT DOCUMENTS

| | | |
|---|---|---|
| 2011/0231408 A1 | 9/2011 | Sasaki et al. |
| 2012/0322458 A1 | 12/2012 | Shklarski et al. |
| 2015/0173036 A1* | 6/2015 | Zombik ............ H04W 12/02 455/456.1 |

FOREIGN PATENT DOCUMENTS

| | | |
|---|---|---|
| EP | 1950684 A1 | 7/2008 |
| WO | 2012/136245 A1 | 10/2012 |

OTHER PUBLICATIONS

Shin et al, "A Profile Anonymization Model for Privacy in a Personalized Location Based Service Environment," the Ninth International Conference on Mobile Data Management, IEEE, Piscataway, New Jersey, Apr. 27, 2008, pp. 73-80.

Kern et al, "Anonymity: A Formalization of Privacy—t—Diversity," Network Architectures and Services, Aug. 7, 2013. pp. 49-56.

Sun et al, "Injecting purpose and trust into data anonymisation," Computers & Security, vol. 30, No. 5, May 17, 2011, pp. 332-345.

* cited by examiner

METHOD FOR ANONYMIZATION OF DATA COLLECTED WITHIN A MOBILE COMMUNICATION NETWORK

BACKGROUND OF THE INVENTION

The invention relates to a method for anonymization of event data collected within a network and to a method for anonymization of customer relation data of a mobile communication network.

Operators of arbitrary systems or networks, i.e. applied in the banking sector, public health sector, telecommunication sector, etc., register customer related data such as personal information about their customers, contact details and optionally contract information. For instance, the data includes attributes regarding the subscriber's name, address, date of birth, bank data and many more. The collection of this data is either necessary for administration, billing purposes or to hold available for authorities. In the following such data is defined as customer relation data (CRM) or static data.

Furthermore, said systems/network might continuously collect additional data during regular system/network operation. The generation of so-called event data is triggered by subscriber activity that raises a certain event within the system or by the system itself. An event data set includes several attributes describing different properties of the triggered event, for example a timestamp, event type, etc. These event data sets are associated with a personal identifier which enables allocation of the generated event data set to an individual customer of the system/network.

One particular application of such a system is a mobile communication system which enables communication between two or more subscribers. Operators of communication systems register subscriber related data such as personal information about the subscribers, contact details and contract information. For instance, the data includes attributes regarding the subscriber's name, address, date of birth, bank data and many more. The collection of this data is either necessary for billing purposes or to hold available for authorities. In the following such data is defined as customer relation data (CRM) or static data.

As event data sets network providers continuously collect additional data called as location event data during regular network operation. Each location event data set is related to a specified event of an individual subscriber. Events may be triggered by a subscriber/user, the network or of a device which is of no importance for further processing. The data set includes several attributes such as an event attribute describing the event type, one or more location attributes identifying the geographical location where said event was triggered by the subscriber and a timestamp defining the time of the event. These location event data sets are associated with a personal identifier which enables allocation of the location event data set to an individual subscriber of the communication system.

Due to holding this information such systems/networks, in particular mobile communication systems, offer the possibility to provide information about the subscriber habits, in particular regarding the location data for a defined time interval. This data can either be used to create location profiles for geographical sites or to derive dynamic crowd movement patterns. In this context, the information could be useful for a wide range of applications in the area of traffic services, smart city services, infrastructure optimization services, retail insight services, security services and many more. Therefore, it is desirable to provide the generated information in suitable form to parties that benefit from applications like the aforementioned ones. Such parties could include local councils, public transport and infrastructure companies like public transport providers or electricity suppliers, retailers, major event organizers or public safety bodies and many more yet unknown uses and users.

However, it is mandatory to provide this information in an anonymous manner to protect the privacy of each individual, in particular each customer/subscriber of the system or mobile communication network. Consequently, the provider of the system/mobile communication network supplying the data should only provide insights extracted from anonymized and aggregated data without disclosing personal information. Disclosure of any personal information is strictly prohibited, tracking and identifying of individuals has to be avoided in any circumstance.

A potential attacker may identify the subscriber of the generated location event data by simply observing the subscriber and an observable event which is detectable to an observing bystander due to actions of the subscriber himself. Furthermore, if too few subscribers of a mobile communication network trigger the generation of the location event data at a small geographical area, the single subscriber may be identified by said small geographical area, for instance if said area characterizes his/her place of living or work.

An additional attack scenario might be the determination of dynamic profiles from behavior patterns. Associating a plurality of dynamically occurring event data to an ID may lead to a unique event profile (e.g. Event Location Profile). The bigger the profile and the longer the ID remains constant, the more comprehensive (sensible) is the information that is collected in respect with a certain ID. At the same time the probability for finding additional information increases (from third party sources), which enable assigning the profile to a specific individual. Therefore, derivation of a dynamic profile affects the disproportionate between the effort for re-identification and the need for protection (increases with increasing sensitivity) of the data.

Another attacking scenario is the derivation of static fingerprints from person-specific properties. If a single ID has certain properties, which (individually or in combination) are unique, two effects may arise:
 (a) The properties permit a direct reference to individuals on the basis of appropriate additional knowledge or
 (b) The properties themselves may constitute an identifier due to their uniqueness wherein the identifier allows creation of full dynamic profiles despite a regular change of the ID.

SUMMARY OF THE INVENTION

It is the object of the invention to provide a method for the anonymization of data collected or used within an arbitrary system or network, for instance a mobile communication network, and which are each related to an individual customers/subscriber of the system/mobile communication network.

The aforementioned object s solved by a method according to the description herein. Preferred embodiments ore also the subject matter of the description herein.

A method for anonymization of event data collected within a system or network providing a service for subscribers/customers wherein each event data set is related to an individual subscriber/customer of the system/network and includes at least one attribute wherein the method counts the number of event data sets related to varying individual subscribers having identical or nearly identical values for at least one attribute. It should be noted that the expression attribute is used in term of a specified property of the event. The attribute might stand for a certain category which may take a certain value. For instance, an event attribute can take different values defining different event types.

Each event data set consists of one or more attributes, for instance containing the time when an event took place but may also contain information about type of event. Each event data set is related to an individual customer of the system, in particular by associating the data set with a personal identifier, specifically with an anonymized personal identifier.

Therefore, each event data set describes an individual event which was triggered by a specified customer of the system/network. For storing and supplying purpose of said collected data, it is mandatory to sufficiently anonymize the data in order to avoid any identification of the individual customer.

Therefore, the inventive method identifies certain attribute values with little activity. That is to say the inventive method counts the number of events which have the same or nearly the same values for at least one attribute and which are triggered by different customers. The lower the number of events triggered by different customers the higher the potential risk of deanonymization which means that the number of different customers is significant. If the number of different customers increases the effort to achieve a deanonymization must be significantly higher than what is to be gained.

In a particular preferred embodiment of the invention the system/network is a mobile communication network and the event data refers to an event data set collected within the mobile communication network. The mobile communication network can be conducted as a mobile communication network according to the 2G, 3G or any other mobile communication standard. Additionally or alternatively, the mobile communication network relates to a wireless location area network.

Each location event data set consists of one or more attributes at least containing the time when an event took place but may also contain information about the place or the type of event in the mobile communication network. At least one other attribute is noted as a location attribute defining the location where the event occurred. In that case, the event data set is specified as a location event data set. Each location event data set is related to an individual subscriber of the mobile communication network, in particular by associating the data set with a personal identifier, specifically with an anonymized personal identifier.

Therefore, each location event data set describes an individual event which was triggered by a specified subscriber of the mobile communication network. For storing and supplying purpose of said collected data, it is mandatory to sufficiently anonymize the data in order to avoid any identification of the individual subscriber.

Therefore, the inventive method identifies locations with little activity. That is to say the inventive method counts the number of events which occur at a certain location and which are triggered by different subscribers. The lower the number of events triggered by different subscribers the higher the potential risk of deanonymization which means that the number of different subscribers is significant. If the number of different subscribers increases the effort to achieve a deanonymization must be significantly higher than what is to be gained.

For the sake of convenience the subsequent preferred aspects of the inventive method are described on the basis of a mobile communication system and location event data as a certain type of event data. However, the present invention should not be limited thereto.

The method preferably executes monitoring and counting over a certain time interval and subsequently restarts monitoring and counting in a new time interval.

In a preferred embodiment of the invention, the method discards all collected location event data sets with events occurring at a certain location if the counted number of these location event data sets related to different subscribers is less than a defined threshold after a defined time interval. The threshold shall be defined dynamically in order to achieve a good ratio between the use of the location event data and the sufficient anonymization of the location event data. Said threshold may be either fixed, set according to situation or user use or set dynamically according to other rules, event requirements.

Alternatively, in a different aspect of the inventive method, all personalized information included in the collected location event data sets, in particular the anonymized personal identifier, may be deleted if the counted number is less than a defined threshold. By discarding all personalized information included in the location event data sets, it is not possible to distinguish whether a certain number of events occurred at a certain location has been triggered by one or more than one subscriber.

In a particular preferred aspect of the invention, the method merges the collected location event data sets of different locations if the number of at least one location is less than a defined threshold. Said particular preferred approach keeps a relationship between different data sets. In contrary to the aforementioned approach it is now determinable whether certain events at certain locations have been triggered by different subscribers. Nevertheless, said preferred approach will guarantee that events at a certain location have been triggered by a sufficient number of different subscribers, thereby avoiding an easy deanonymization process.

Merging of the location event data sets of different locations can be performed by replacing the location attributes of said location event data sets by a generalized location attribute. The number of location event data sets related to varying individual subscribers is counted for a certain location wherein the location can be defined as a certain geographical area. Merging of the location event data sets can be either performed by increasing the geographical area and/or increasing the radius of said geographical area and/or increasing the inaccuracy of the area or the decision whether an event occurred with said area. Furthermore, different location attributes which describe geographical areas which are adjacent to each other can be combined to a larger geographical area including both smaller areas. Therefore, the location attributes of the merged location event data sets are replaced by said larger geographical area. It is also possible to combine congeneric geographical areas which are not located adjacent to each other.

By concentrating location event data sets of adjacent locations the number of events related to different subscribers increases. Merging of adjacent locations is to be repeated until the number of individual subscribers triggering location event data sets exceeds the defined threshold. A limited inexactness of the replaced location information is accepted due to a more sufficient anonymization of the location event data.

It is conceivable that only location event data sets of locations with a counted number of location event data sets below the defined threshold are merged. However, if the desired number of location event data sets is not achievable by only merging said locations it might also be possible to merge a location with a number of location event data sets below the defined threshold with one location with a number of location event data sets exceeding the defined threshold wherein merged areas may each be below the set threshold but combined exceed it.

The generation and collection of a location event data set is preferably triggered by an individual subscriber who requests for a specified service of the mobile communication network. For instance, requesting a service may include the transmission of a short message (SMS, MMS), an incoming and/or outgoing telephone call, and an initiation of a data session or the like. An event which is indirectly triggered by the subscriber for example is a known handover process which will also generate a location event data set. A subscriber terminal may also initiate a positioning process by itself, in particular based on a GPS receiver and triggered by a smartphone app, but also using other location methods such as using Wi-Fi or mobile network cells, by periodical location updates by the network or active paging by the network. Further, the terminal might be passively located by the network, for instance based on triangulation. Such events may also generate respective location event data.

The location event data sets include a timestamp attribute defining the time at which the event occurred. In case of a visual event a potential attacker could compare the event observed in the real world to the available location event data sets. If the observed event matches to an available timestamp and event type within a location event data set the included anonymized personal identifier is allocatable to a certain person (the personal identifier remains anonymized/hashed although). Therefore, according to a preferred aspect of the invention the timestamp attribute is also obfuscated, especially for observable event types but obfuscation is also possible for non-observable events.

In a preferred embodiment of the invention the timestamp is modified by either rounding the timestamp or by adding a time-offset which in turn may be randomly set. Therefore, a potential attacker cannot associate a visible event to a specified location event data set with respect to the stored timestamp.

In another preferred embodiment of the invention event types can be defined, which are combined into certain classes. An attacker could trigger a plurality of events of a certain type in a certain way (e.g. in a temporal pattern), for instance a transmission of fifteen SMS is triggered wherein each is send in a gap of seven minutes and seven seconds to each other. Such a behavior pattern could traceable in the data base. By an adequate combination of certain event types into classes such attacking scenarios can be prevented. For example, all events (SMS reception, call input, etc.) which can be triggered by third parties can be combined into a common class which increases the effort for an attacker to trace respective behavior patterns within the data base.

The present invention also relates to a method for anonymization of static data related to individual subscribers of a mobile communication network with features described herein.

Preferred embodiments are also the subject-matter of the description herein.

According to the invention, each static data set, also noted as customer class data (CCD), consists of different attributes referring to personal information about the subscriber. The information contained in a single data set is therefore defined by the combination of the different attributes referring to personal information and other non-personal attributes. The inventive method ensures that the number of occurrences of data sets with identical personal information (i.e. identical combination of attributes with personal information) is higher than a configurable threshold. This can be achieved by the use of an implementation of k-anonymity. The general implementation of k-anonymity was proposed by P. Samarati and L. Sweeney. In this context, reference is made to P. Samarati and L. Sweeney, "Generalizing Data to Provide Anonymity When Disclosing Information", Proceedings of the seventeenth ACM SIGACT-SIGMOD-SIGART symposium on Principles of Database Systems, pp. 188, 1998 (ACM).

The inventive method therefore applies k-anonymity for anonymization of static data related to individual subscribers of a mobile communication network by either suppressing particular attribute values or by generalization of attribute values which effectively means that the data sets are transformed to hold to less specific information.

Therefore, values of at least one attribute type are replaced by general values. The selection of attributes to be generalized, i.e. classified, can be considered in a hierarchical order, for instance classification of all attributes regarding a time is performed at first. If the requirement with respect to deanonymization are not fulfilled classification is applied to a different kind of attributes, for instance related to location or event information. It is also possible to have a hierarchical order for classification within a certain attribute type. For instance, the inaccuracy of location information of a location attribute is increased in steps. Location information can be given by a cell identifier and replaced by a multi-digit zip-code. For further increasing the inaccuracy of said location information the zip-code may be reduced to a lower number of digits.

The process of classifying is preferably performed by replacing a certain attribute of two or more static data sets with a generalized common attribute. The step of classification is further preferably performed until the number of static data sets of each group exceeds a defined threshold.

It is possible that at least one attribute of the static data set relates to the gender or the date of birth or the age or the profession or the place of residence of an individual subscriber of the mobile communication network.

Classification may be done by generalizing several dates of birth of different subscribers to a specified time interval including the different dates of birth. Furthermore, the attribute referring to the profession of a subscriber will be replaced by an attribute describing the industrial sector of the respective professions. For example, health professionals and nurses will classified as persons working in the health sector.

In a preferred embodiment according to method for anonymization of static data a subset of the total static data available at the mobile communication network is predetermined dependent on at least one criterion wherein the anonymization method is only performed for the predetermined subset. So far, anonymization of static data is applied to the entire customer base (static data base) or all persons in the data base of the mobile network provider. However, if a subscriber shows a discrepancy from normal behaviour, for instance if the subscriber is on vacation and the actual location differs from the home location for a long time, the subscriber will be conspicuous during the filtering process requiring a filtering out of said subscriber. Otherwise the filter outcome will be rather coarse. A limitation of the entire database to a subset of the static data will improve anonymization results, in particular the degree of accuracy may increase.

Further preferable predetermination for a subset is based on a relevant time period and/or relevant geographical section. For instance, the geographical section is defined to a certain location like "Berlin Alexanderplatz" and the time period is defined by a current date "22.12.2014" and time interval "13:00-20:00 clock". Further, relevant attributes (e.g. "sex" and "home area") which may be of interest for the receiving data aggregator are defined.

If the considered time window covers several days (generally short time intervals ST) a query for the frequency of the reoccurrence of a certain event would be also possible. Short-time IDs which are valid (constant) for short time in order to avoid creation of dynamic profiles and which are present in an area A (e.g. data aggregator) are transferred to another organizational field B (e.g. Different responsible entity, for instance a third party or data supplier) by request. Section B possesses the respective key for converting short-term IDs into long-term IDs by way of the MAP algorithm as will be described with reference to the embodiments. Due to the fact that various short-term IDs from A can be associated with each other at section B it is possible to derive a statement of reoccurrence of a certain event within a long-term time interval. However, anonymity is preserved since A only transmits IDs and section B does not receive information about the event data referring to the IDs. As a response A only receives k-anonymous, aggregated data. Referring to the example above ("Alexanderplatz") B does not even know that the received request from A is related to the location Alexanderplatz or to a particular time interval. A receives the aggregated k-anonymous data without further information to which ID said aggregated data is related to. Consequently, A is only in possession of event data and static data is located and limited to section B. The preferable request logic enables a statement from both data types without merging the data types.

It may be conceivable that the subset is predetermined and requested by a data aggregator receiving the anonymized static data. Such a request is than sent to a module performing the anonymization process including generalization and/or suppression in order to achieve a sufficient level of k-anonymity. The data aggregator comprises only event-based data, for instance approved location event data received from the location event data filtering process as describe in the light of the first aspect of the present invention. The data supplier comprises only static data (CRM data and event data derived from the statistics). By using different obfuscated personal identifiers in both areas, the data can be related to each other only via said request of the data aggregator.

It may be advantageous if the anonymization method (generalization/suppression) is individually configurable for each individually predetermined subset wherein preferable configuration parameters are passed together with a request of the data aggregator. This enables a dynamic adaption of the filter settings which is optimized for each requested subset.

For instance, configuration may include a prioritization of the attributes to be generalized/suppressed and/or a definition of a maximum/minimum hierarchy level for each attribute and/or a definition of the ratio between generalization and suppression. For instance, prioritization provides a weighting of the relevant attributes, that is to say which attribute should be generalized with higher priority. Further, the minimum level of hierarchy refers to a minimum degree of accuracy which is desired for a relevant attribute. The maximum hierarchy level of each attribute refers to a maximum allowable generalization level before the data set is suppressed instead of generalized. Lastly, a general weighting between suppression and generalization can also be defined to achieve a desired ration.

To avoid creation of static fingerprints as indicated in the introductory part of the application the actual static properties of an ID must always be obfuscated (generalized) in a way that they do not leverage the criterion of disproportionate in relation to an reidentification if considered by themselves or in any combination with other data, especially in combination with dynamically occurring location event data.

A special feature of the present invention is the introduction of a technical working flow, which on the one hand effectively prevents static fingerprints by integration of a request logic and, however, at the same time provides a high flexibility for each request ensuring a maximum quality of significance for each individual request.

The invention is also related to a communication system or performing the method according to the description herein and/or the method according to the description herein. It is clear that the communication system is characterized by the properties and advantages according to the inventive method. Therefore, a repeating description is deemed to be unnecessary.

BRIEF DESCRIPTION OF THE DRAWINGS

Further advantages and properties of the present invention are described on the basis of two embodiments shown in the figures. The figures show.

DESCRIPTION OF THE PREFERRED EMBODIMENTS

Figure 3:
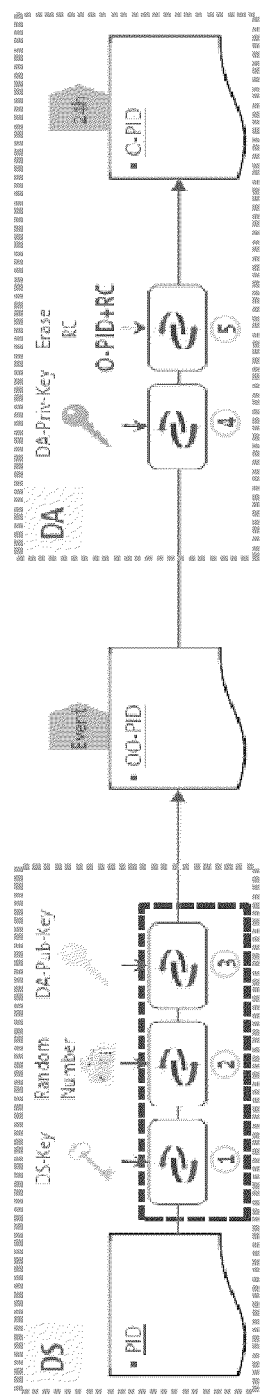
FIG. 3: schematic overview over the basic method steps of multi-level anonymization process (MAP)

FIG. 3 illustrates the fundamental idea of a multi-level anonymization process (MAP). The basic idea of that anonymization process relates to a data anonymization procedure to enable the usage of mass location data for big data applications with fully respect of European data protection standards. Mass location data will be collected by mobile or wireless communication network providers as well as providers collecting information which are based on other location technologies like GPS; Galileo, Glonass, Compass, sensor networks, etc. which additionally may possess detailed and verified personal information about their subscribers.

Further, mobile network providers are able to extract location event data of the subscribers. Anonymized and aggregated information gathered by mobile network operators may provide interesting insights for different applications by third parties.

For instance, mobile network providers might provide anonymized and aggregated data to local councils, public transport companies, infrastructure combines, like public transport providers or electricity suppliers, retailers, major event organizers of public safety bodies which use such information for improving the decision-making processes and other yet unknown uses.

However, it is mandatory to take care of the privacy of each subscriber and personal subscriber information. By splitting over the process into several process steps which are executed within different systems which may additionally in itself be located in different security zones with specific access rights or even in legal premises of independent entities, the possibility of generating an allocation table between anonymized and not anonymized identifiers is prevented.

As can be seen in FIG. 3 a data supplier referenced as DS is communicatively connected over a public or a virtual private network to a data aggregator referenced as DA. The data supplier entity DS can be any provider of movement and/or personal data. As described DS and DA are physically separated and assigned to independent systems. Generally, DS and DA fulfill different tasks which can be assigned to different users having differing authority profiles on a common system or performed within different security zones of a common system.

The exemplary embodiments according to the figures are based on a mobile network system as a data supplier DS which provides the aforementioned data sets containing personal data as well as location event data about its subscribers. Each individual subscriber of the overall network of the DS is identified by a personal identifier PID which might be a known identifier as the IMSI of a subscriber. To have a real anonymization according to European data protection standards, it is inter alia necessary to have separation of the initial PID and its counterpart, the O-PID (obfuscated personal identifier). In this context, the effort of bringing together these two identifiers has to be unreasonably high compared to the yield which could be earned by such an action. This requirement is fulfilled if the separation is realized physically within the premises of two legally independent entities whereby one entity only knows the PID and the other one only the O-PID. However, the separation of the DS and DA can also be realized by one of the alternative possibilities as proposed above. In any case, it is necessary to encrypt and transmit the O-PID to a third party named as the data aggregator DA. That personal identifier is combined to a data set with additional data attributes describing a certain location event. For instance, these event data attributes characterize an action of a subscriber at a certain place. Possible attributes are the event type, event location and timestamp. In this example, encryption is only performed for the personal identifier but can also be done for other data.

The obfuscation of the sensible data should be realized by a multi-level anonymization process (MAP) performed at the DS to protect the user privacy. In a first step 1, a base anonymization is performed by applying a non-reversible, keyed hashing algorithm to the PID, where the key (DS-key) is only known to the data supplier DS. Said hashing algorithm should be a strong cryptographic hash function. Different DS-keys may be available at the DS side having different lifetimes like ST/LT (short-time/long-time), for instance. The output of the first method step is a single obfuscated PID referenced as O-PID. The lifetime of such O-PID is dependent on the interval the DS-Key is changed. That is to say if the DS-Key is for example constant for 24 hours, the DA will get a static obfuscated identifier for exactly such period of time. The type of DS-key used for obfuscating the PID depends on the data set/data attributes which are transmitted to the DA or Third Party in combination with the obfuscated PID. For instance, a short term key (ST-key) is used for obfuscating the PID which is sent in combination with customer class data wherein a LT-Key is used for the MAP process when obfuscating the PID for transmitting location event data sets.

In a second step 2 a random component or string, e.g. preferably a multi-digit random number is added to the output O-PID of the base anonymization procedure according to the first step 1. It is noted that the random number might be inserted at any position of the O-PID wherein the position has to be known by the DA. It is further noted that any other randomly generated character string and any other procedure of combining the two strings might be appropriate. The interval length of the used random number could also be variable, but has to be known by the DA. The output of the second step is marked as O-PID+RC.

In the last step 3 a second-level encryption which is also called additional encryption "AE" is executed on the basis of an asymmetric encryption mechanism using the public key DA-Pub-Key of the second entity DA. The asymmetric encryption is applied to the outcome of step 2 O-PID+RC resulting in an outcome which is marked as OO-PID. Consequently, the PID is double obfuscated to protect the user privacy.

The lifetime of double encrypted identifier OO-PID is only dependent on the interval on which the random number used in step 2 is changed. This means that the OO-PID is constant as long as the RC is constant which is important for calculations done on the OO-PID by a trusted partner (e.g. building of statistical indices). In contrast, the actual value of the random number is not required for decoding of the OO-PID at the DA.

Steps 1-3 are implemented in an atomic unit of work. It is impossible for the data supplier DS to read or write any information generated between the single steps. The random component used in step 2 may change on pre-determined conditions, preferably for every data set.

Steps 2 and 3 may be performed in multiple iterations, each iteration done by using a different key.

At the data aggregator side DA decryption is executed on the additional encryption according to step 3 by using its private key DA-Priv-Key to decrypt the received encrypted identifier OO-PID. The outcome O-PID+RC will be further processed by erasing the known number of digits at the end of the string that represent the random number. The resulting outcome is the O-PID. The lifetime of this single encrypted identifier O-PID at the data aggregator side DA is defined by the interval length of the generated DS-Key. If the interval length of the DS-Key has elapsed a new DS-Key and therefore a new O-PID will be generated at the DS.

The regular change of the PID decreases the probability for creation of dynamic profiles and thus the disproportionality between the effort for reidentification and need of protection is affected in two ways The original PID is only visible at the data supplier side DS since the data aggregator side DA only knows the single encrypted identifier O-PID. Therefore, it is impossible to build a catalogue (a table that assigns each non anonymized PID to its anonymized counterpart, the O-PID) within the premises of one single party.

The outcome of the above-explained multi-level anonymization process (MAP) is that the data supplier DS is not able to find out the obfuscated PID. The same applies to the data aggregator DA which is not able to find out the original PID on the basis of the supplied obfuscated PID.

However, as explained in the introductory part of the description, direct deanonymization is still possible for location event data sets which are triggered by visible events. A potential attacker could observe a subscriber and a visible event and assign his observation to a specified location event data set supplied by the data supplier. In that case, the anonymized subscriber, for instance the O-PID is identified.

Figure 1:
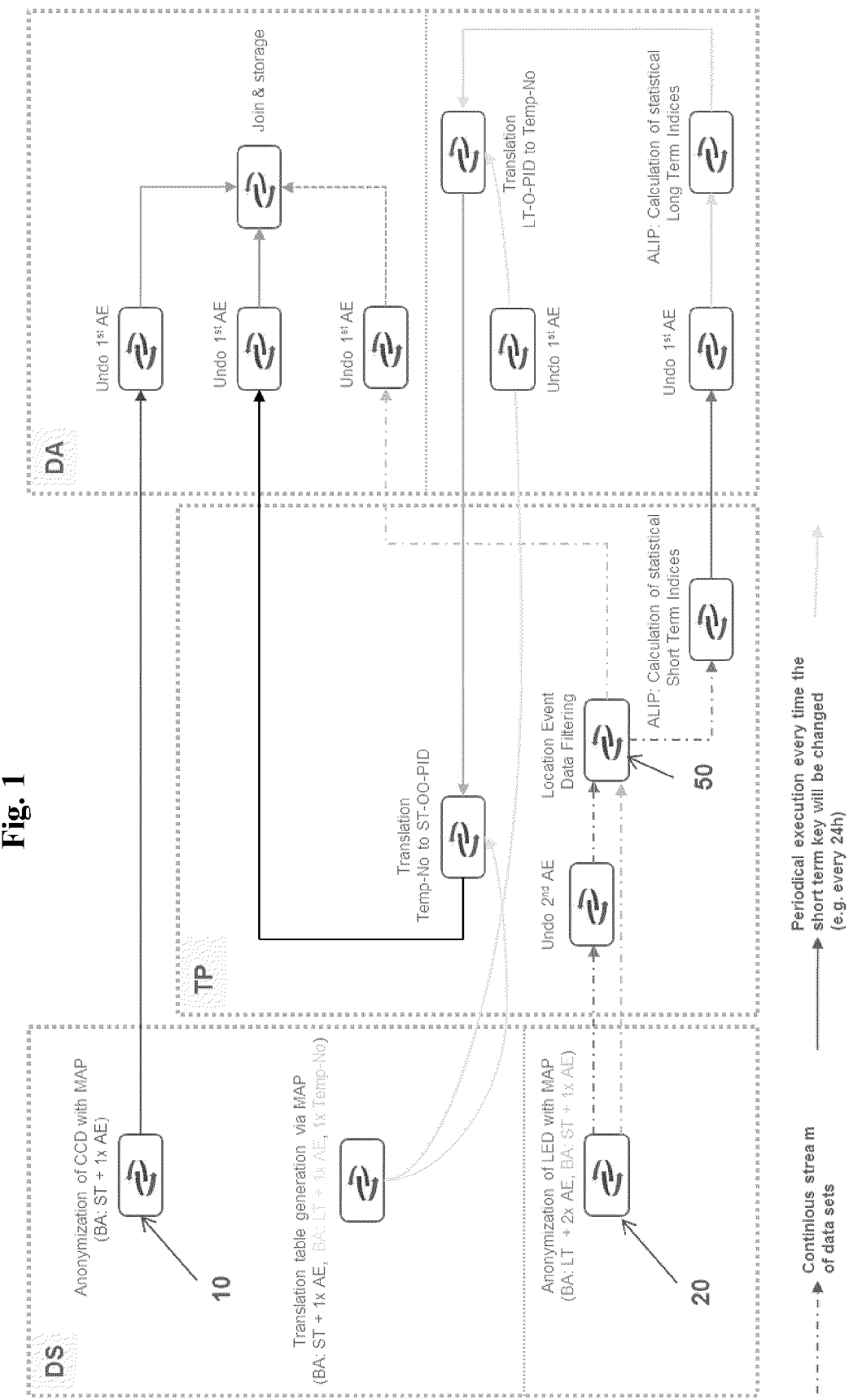
FIG. 1: an architectural overview over the system using location event data filtering according to the invention.

To avoid direct deanonymization an additional anonymization component which refers to the inventive idea of the application is integrated into the complete anonymization process. FIG. 1 shows a possible embodiment of the present invention. It describes a technical solution for the anonymization of different data sets delivered by one single data supplier DS. Anonymization as well as the transmission of these data sets to one single data aggregator DA is processed by entirely separated processes running at the data supplier DS. The different kinds of data sets can be combined on the basis of the equal identifiers O-PID at the data aggregator DA.

The whole process is subdivided into two independent multi-level anonymization processes (MAP) where the personal identifiers PID (as unique elements between the data sets) are separately anonymized and transmitted to the data aggregator together with their respective data sets. Thereby, the first MAP process 10 is responsible for transmitting the so-called customer class data which includes attributes classifying the subscribers into different subscriber class groups, for instance gender or age groups.

The second MAP process 20 is responsible for transmitting the so-called location event data sets with attributes including the event type, a timestamp when the event occurred and the subscriber location defining the location where the event occurred. The location data set mandatorily includes at least a timestamp, further attributes as event type and location are optional. The PID is anonymized by the base anonymization and the addition encryption which is performed iteratively for two times.

As can be seen in FIG. 1, the location event data sets in combination with their obfuscated PID are transmitted to a trusted partner TP who executes the location event data filtering 50 which refers to the inventive method of the present invention. Before the execution of the filtering process 50 the second additional encryption is undone 51. The inventive location event data filtering process will only approve those location event data sets which show a minimized risk for direct deanonymization. The approved location event data sets will then be transmitted to the data aggregator DA. The data aggregator can use the approved location event data sets for further processing.

Figure 4A:
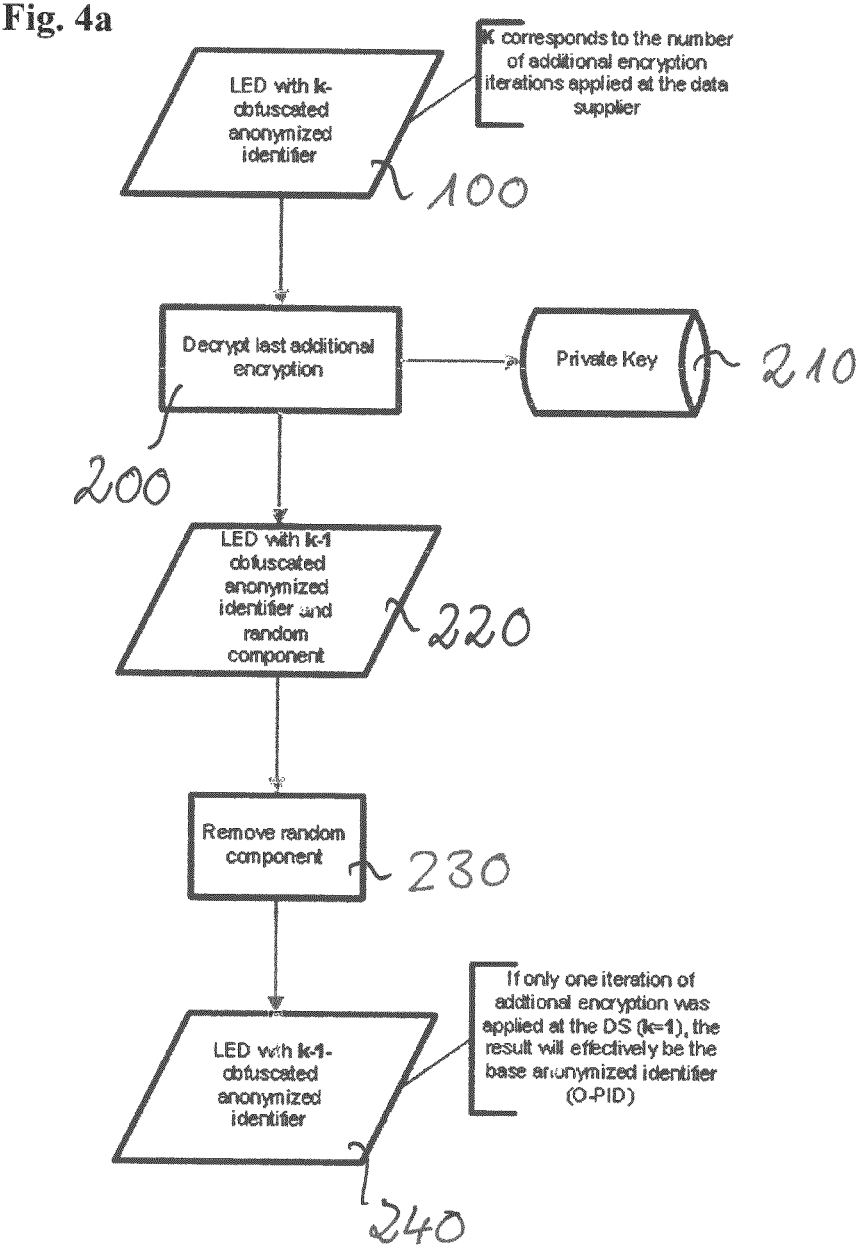
FIG. 4: a flow-diagram showing the process of location event data filtering.
Figure 4B:
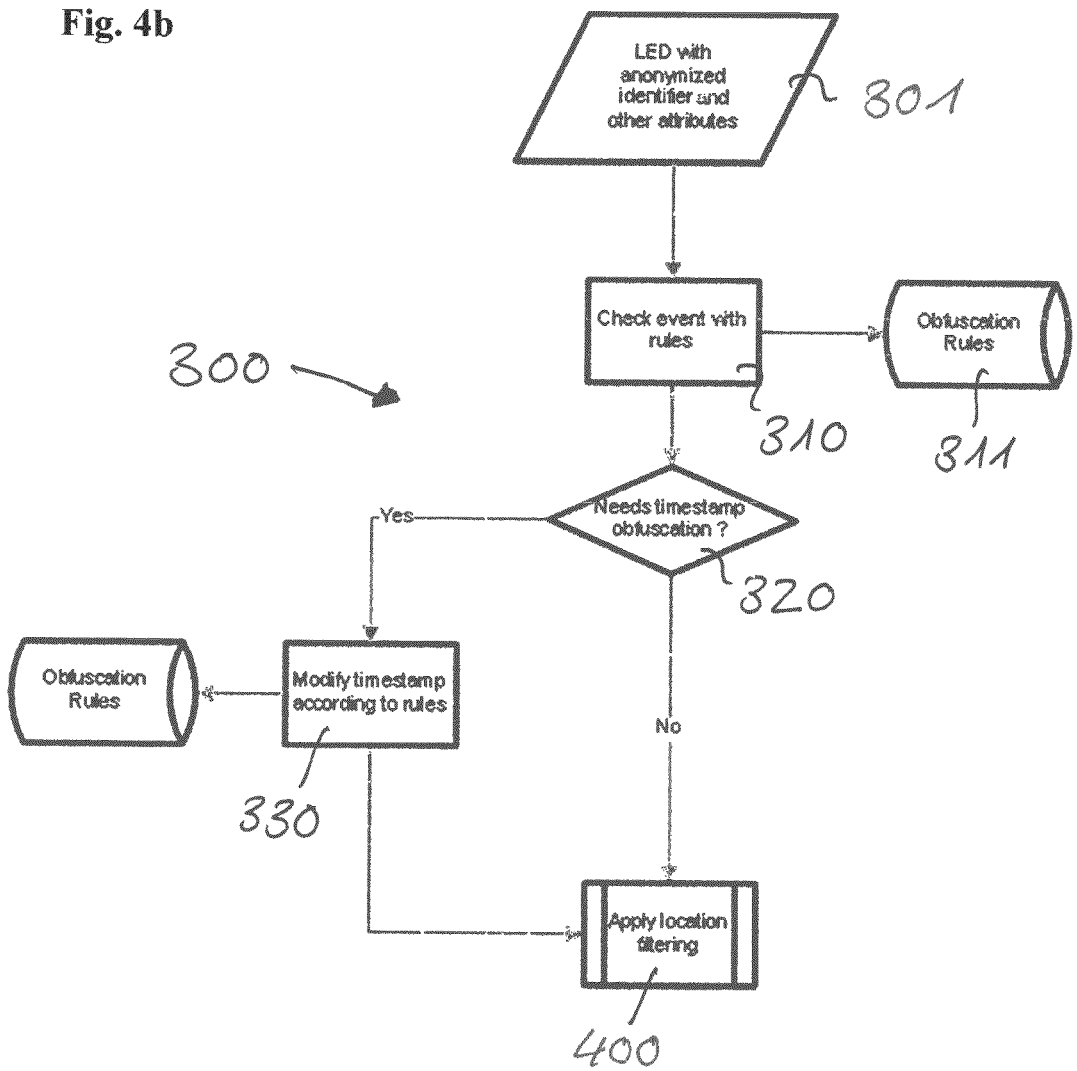

Details of the location event data filtering process 50 according to the invention will be explained on the basis of FIGS. 4a, 4b 4c which show several flow diagrams of the respective sub processes. FIG. 4a shows a block diagram of the necessary steps for undoing the additional encryption in process 51 of FIG. 1. At block 100 the trusted partner TP receives an anonymized location event data set. Due to the previous multi-level anonymization process (MAP) with k additional encryptions reversed by the DA, each location event data set does not provide any insight to the individual subscriber referenced to the location event data set. For instance, in FIG. 1 k is equal to 2. Therefore, in the second step 200 the last additional encryption of the obfuscated PID is reversed by using the private key 210. The resulting outcome 220 is the k−1 obfuscated PID including a random component. The random component is removed in block 230 resulting in a k−1 obfuscated anonymized identifier in block 240. If only one iteration of additional encryption was applied at the DS (k=1), the result will be effectively be the base anonymized identifier O-PID.

The location event data set 301 including the resulting k-1-PID according to block 240 and the non-encrypted attributes is transferred to the filtering process 50. The filtering block starts with the so-called subprocess timestamp obfuscation 300 shown in FIG. 4b. At block 310 the subprocess checks the rule database/configuration 311 whether specified filtering rules exist depending on the event type of the location event data set 301. For example, block 310 checks whether the included event type of the location event data set is an observable event, which can be observed by a potential attacker. If the event type is a non-observable event type the method will step over to block 340. Examples for an observable event type are the transmission of a short message, initiating an outgoing call, receiving an incoming call or initiating a data session. An example for a non-observable event type is a handover procedure within a mobile communication network which hands over a mobile terminal of a subscriber from a first mobile cell to an adjacent mobile cell. It should be noted that such a handover procedure is also performed during operation of a wireless location area network.

If the trusted part discovers that the event type of the checked location event data set is an observable event type, the method proceeds with block 330. In block 330 the included timestamp attribute of the location event data set is obfuscated by manipulation. In detail, the timestamp will be modified as described below to avoid any direct deanonymization by observing the respective event. The modification of the timestamp may be done by assigning the event to a time-frame, rounding the actual timestamp or offsetting the timestamp by certain offset, preferably determined randomly. Afterwards, the method will step over to subprocess 400 for filtering.

Figure 4C:
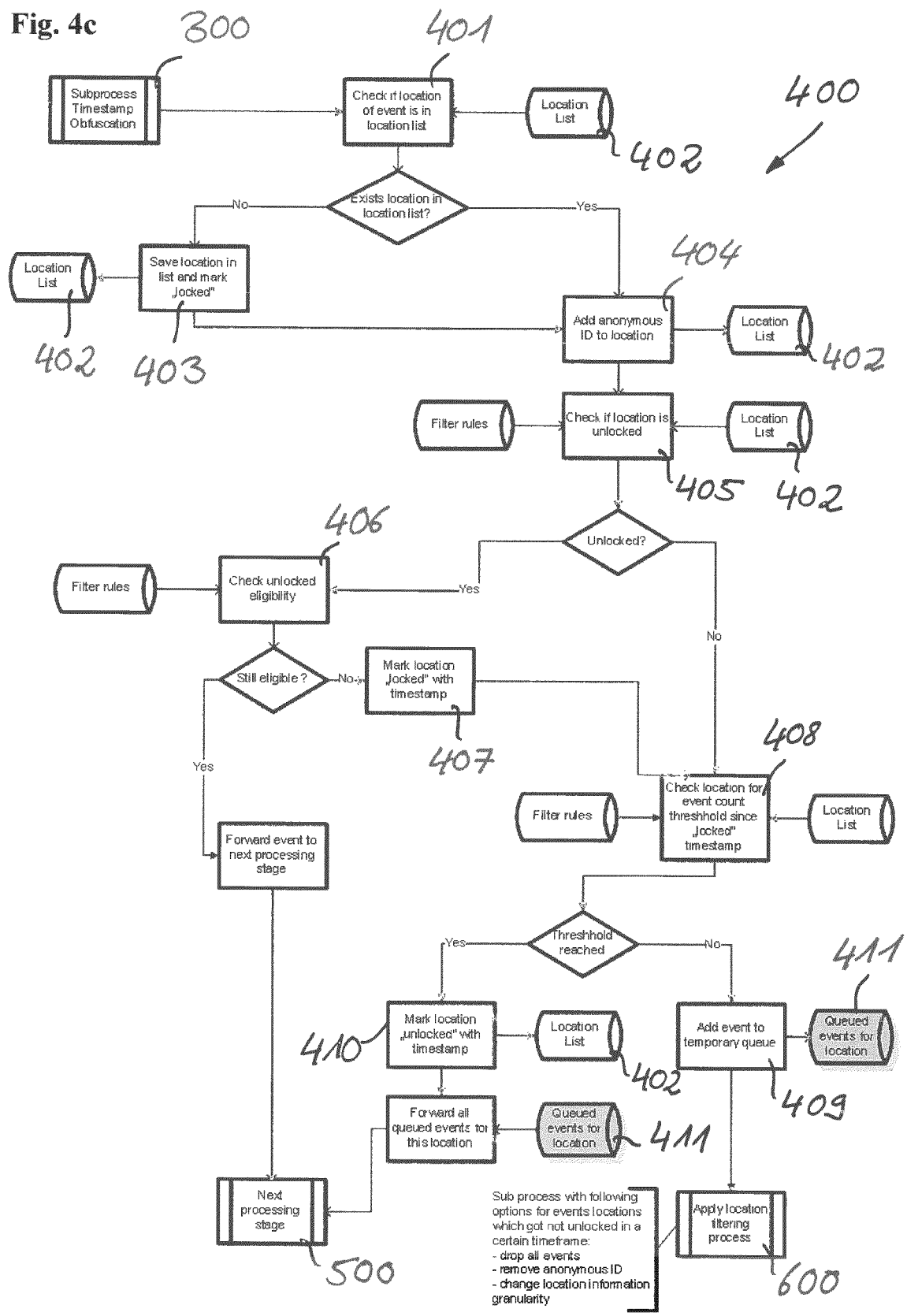

FIG. 4c discloses the filtering of locations with too little activity. In summon, the filtering process compares the location of several location event data sets received within a certain monitoring time interval and counts the number of different obfuscated PIDs for each detected location. Thereby, a location list is created citing all locations and the number of different OO-PIDs who triggered an event at said location. The monitoring time interval usually corresponds to the lifetime of the first private key used at the data supplier for single obfuscating the PID. The filtering process can also be applied to non-obfuscated personal identifiers PID as preprocessing of data. Generally, the inventive filtering process is an independent process which can be performed at any stage of location of the described system or any other system.

In detail, at block 401 the location of the location attribute of the received location event data set is determined and compared to a location list 402. If the list already contains a matching location the anonymous ID (k−1)-PID is added to the stored location in step 404. If the list 402 does not contain a matching entry a new location is created as a new entry in the location list 402 and marked as "locked" according to step 403. Such locations which are marked as locked are not approved for transmission to the DA entity wherein location marked as "unlocked" are approved for transmission. Further, each location is marked by its current status "locked/unlocked" together with a timestamp characterising the point of time at which a change of status occurred. Subsequently to step 403, the (k−1)-PID will be added to the new location in the list in step 404.

In the next step 405 the process checks the current status of the location to which a (k−1)-PID has currently added. If the location is currently marked as "unlocked" the process will recheck in step 406 whether the status is still eligible. If "yes" the respective location event data set is forwarded to the next processing stage 500 which includes the transmission to the DA. If the marking of the location is not eligible the location is marked as "locked" in step 407 and the process continues with step 408 which is also executed when the first check in step 405 has revealed that the location is currently marked as "locked".

Step 408 counts the number of different (k−1)-PIDs which have been added to the determined location of the location event data set within a certain time interval. The beginning of said interval is defined by the timestamp stored for each location. If the number of different k−1-PIDs per location does not exceed a certain threshold, the respective location event data set is added to a temporary queue 411 in step 409. If the status of these locations remains "locked" for a certain time interval a location event filtering process is applied to these data sets at subprocess 600. The subprocess 600 will be explained later on.

If the number exceeds the threshold, the location is marked as "unlocked" together with a timestamp and the all location event data sets included in the queue 411 and referring to the counted (k−1)-PIDs are forwarded to the next processing stage 500 which is responsible for the transmission of the data sets to the data aggregator DA.

Location event data sets referring to "locked" locations which have not been unlocked in a certain timeframe can be processed by three different options in subprocess 600.

As a first option, these location event data sets are completely discarded.

As a second option, it is possible to cancel the (k−1)-PIDs included in the location event data sets of the "locked" locations. Subsequently, location event data sets of "locked" locations are transmitted to the data aggregator without any identifying information. Indeed, the data aggregator DA can use the received location event data for further applications, however, there will be no referencing between the received different location event data sets. For instance, it is not determinable whether different data sets have been generated by one or more subscribers.

As a third option, it is also possible to combine the location event data sets of two or more adjacent locations and to accumulate their numbers of different subscribers. For example, if the list includes two locations having each a low number of different subscribers, both locations are combined with each other in order to exceed the respective threshold for the number of different subscribers.

A location can be defined as a certain geographical area. It is preferred to combine those locations which show the lowest number of subscribers and located adjacent to each other. If the combination of non-approved locations does not achieve the defined threshold, it is also possible to combine a non-approved location with an approved location. It is mandatory for approval that the combined locations achieve the respective threshold of different subscribers. If the necessary threshold is exceeded the location attributes of the respective location event data set of combined locations are replaced by a common location attribute defining the combined location area. However, it is also possible to combine congeneric geographical areas which are not located adjacent to each other. Subsequently, said location event data sets are transmitted to the data aggregator DA.

Figure 2:
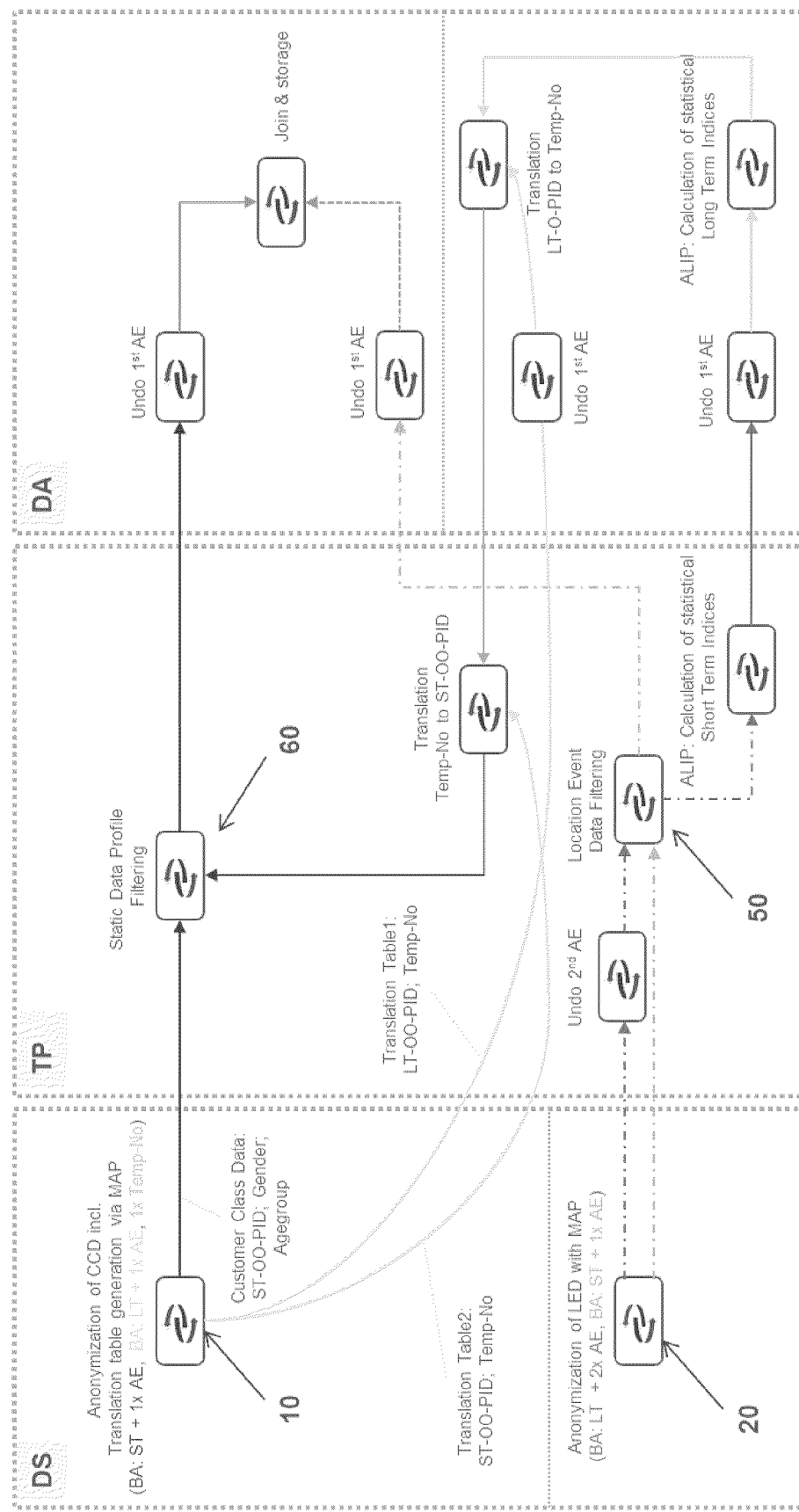
FIG. 2: an architectural overview over a system according to FIG. 1 and additional including static data filtering.

The step of combining can be also performed by increasing the geographical area and/or increasing the radius of said geographical area for which the number of location event data sets is counted and/or by increasing the inaccuracy of the area or the decision whether an event occurred within said area FIG. 2 shows an extended approach of the embodiment depicted in FIG. 1. As can be seen, in addition to the process of filtering location event data 50 filtering of customer class data/static data is performed at the trusted partner TP.

The anonymized customer class data 10 is sent to the trusted partner TP and analysed by the separated data filtering process 60. Thereby, the filtering process 60 identifies too specific profiles. If such a profile is detected, the filtering process 60 offers two different possibilities.

As a first option, it is possible to drop the whole detected profile or rather the respective location event data sets identified by the filtering process 60. As a second option it is possible to drop or generalize just single attributes included in the customer class data. For example, if the customer class data includes attributes referring to the age or gender of a certain subscriber, it is possible to generalize the attribute age. The generalization can be performed by replacing the original attribute age including a certain age by an age interval, for instance 30 years to 40 years. Due to that manipulation of a certain attribute of the customer class group, a certain attribute group will contain more different subscribers. The increasing number of subscribers per group complicates the identification of specific subscriber profiles. Therefore, an indirect deanonymization through individual static data profiles is avoided. After a generalization of the static data profiles, customer group data is approved and sent to the data aggregator DA.

So far, the filtering is applied to the entire customer base or all persons in the data base of the mobile network provider and filtered data is provided to the data aggregator as a whole. This may lead to rather coarse results striving for sufficient level of anonymity. However, if a subscriber shows a discrepancy from normal behaviour, for instance if the subscriber is on vacation and the actual location differs from the home location for a long time, the subscriber will be conspicuous during the filtering process requiring a filtering out of said subscriber, called suppression. Since the static data filter at this point in the process is not aware of a subscribers location a purely static view might not be sufficient. In the light of the above it is a preferred embodiment of this invention to provide filtered and therefore anonymized static data to the data aggregator only based on predetermination of a subset of data and not as a whole.

A predetermination of said subset is triggered by a certain request of the data aggregator which is sent to the static data filter 60 handling the incoming request and providing filtered static data to the data aggregator according to the received request. The data aggregator comprises only event-based data, for instance approved location event data received from the location event data filtering process 50. The data supplier DS comprises only static data (CRM data and event data derived from the statistics). By using different IDs (PIDs) in both areas, the data can be related to each other only via said request of the data aggregator DA.

The general function of the static data filter 60 as described with respect to FIG. 2 remains the same. A request logic is implemented which selects a subset out of the entire data base to the static data filter 60 wherein said subset is individually for each request. This enables the filtering process to provide a "best possible data quality" while still complying with the anonymity regulations. Further, the static data filter 60 is upgraded by a configuration interface allowing an individual filter configuration for each request.

Therefore, it is possible to define for each individual case the "best possible data quality" (e.g. relationship between suppression and generalization).

Figure 5:
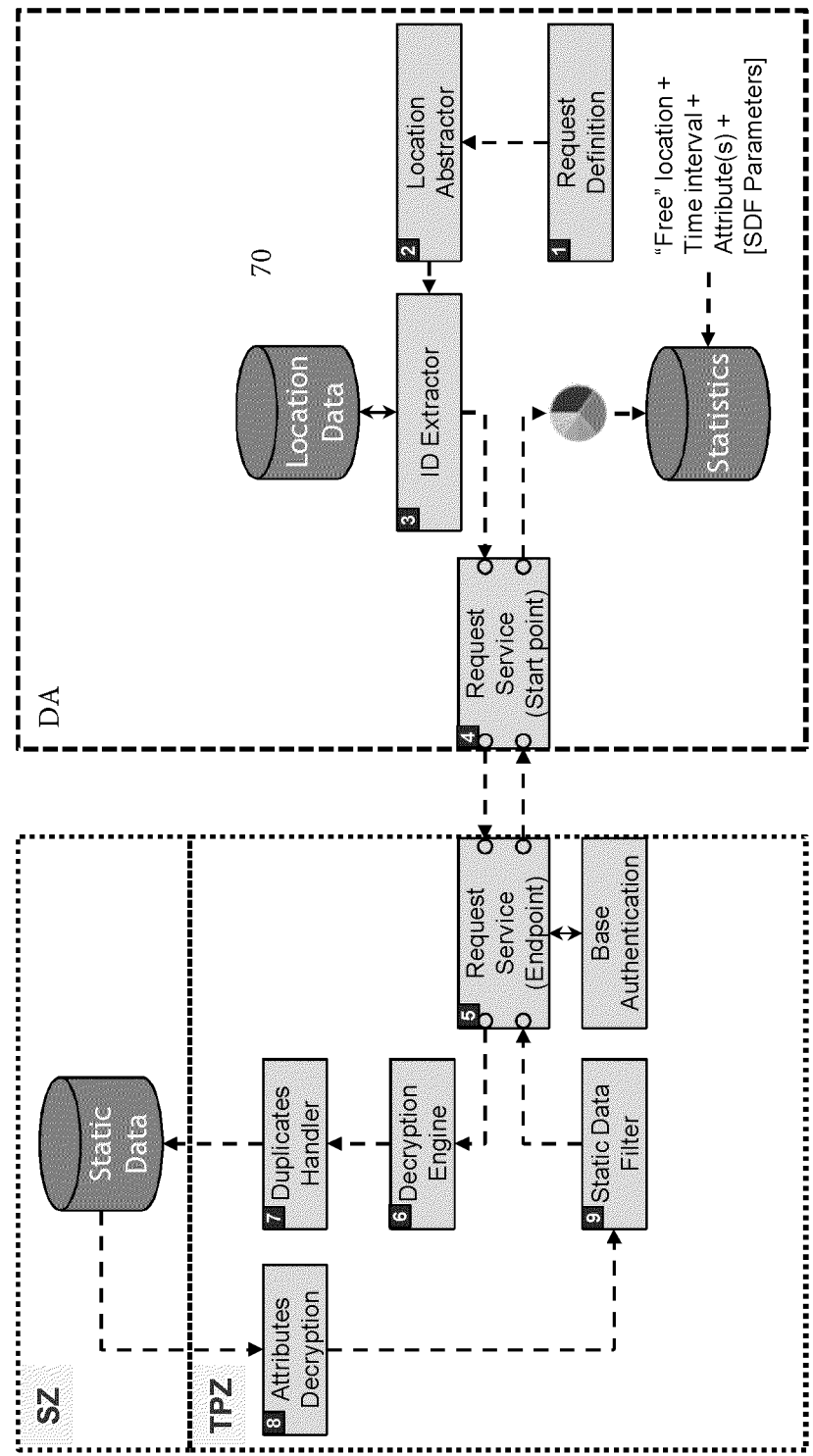
FIG. 5: an architectural overview of a preferred embodiment of a system according to FIG. 2 with an optional predetermination step for requesting only a subset of static data

Such a predetermination procedure is depicted in FIG. 5. Database "location data" 70 includes event data sets for which only their corresponding short-time double obfuscated ID (ST-OO-PID) is known. In block 1 "Request Definition" at the data aggregator a definition of a geographically and temporally section to be requested is made, for instance "Berlin Alexanderplatz" on "22.12.2014 13:00-20:00 clock". The time window can be defined for each request within a maximum of one year which corresponds to the maximum long time interval (LT). Thus, the predetermined event data sets correspond to a subset of all possible users or records from the static data. Further, the relevant attributes (e.g. "sex" and "home area") are defined. If the considered time window covers several days (generally short time intervals ST) a query for the frequency of the reoccurrence of a certain event is possible.

Block 1 could optionally contain the following steps. A static data filter configuration can be defined for each individual request. For instance, said configuration contains information about the weighting of the relevant attributes, that is to say which attribute should be generalized with higher priority. Further, the minimum level of hierarchy of each attribute can be set that is to say the minimum degree of accuracy which is desired for a relevant attribute. Moreover, the maximum hierarchy level of each attribute can be determined defining the maximum allowable generalization level before the data set is suppressed. Lastly, a general weighting between suppression and generalization can be defined.

Further, active IDs are determined within block 1.

The location abstractor 2 performs a mapping between the geographical sections defined in block 1 and the mobile cells of the mobile communication network. The mapping process might include "virtual" intermediate levels (GRID-structure) and algorithms for statistical improvement of the geographical accuracy, for instance different weighting of different geographical areas (streets or public places with high density of use vs. forests or lakes with low density of use, etc.).

The ID extractor 3 derives the relevant IDs which have been active within the defined time window and the actual (or possibly virtual) geographic section defined by the request of block 1.

In step 4 the request message is created containing a request ID, the activity period of the request associated to a considered long-time interval (LT), a list of all relevant IDs derived by the ID extractor 3, a list of relevant attributes as determined by the request definition in block 1 and optionally a static data filter configuration. Afterwards the request is forwarded to the temporal processing zone TPZ which is normally located at a trusted partner TP (FIG. 2).

At block 5 at the temporal processing zone TPZ the requested service is checked for authorization. If the authorization process is successful a service type (here: Group Statistics Service) is chosen and the incoming request is accepted. Module 6 decrypts the transmitted IDs included in the received request by using the respective period decryption key which is valid for the activity period. The decryption process creates LT-IDs (LT-O-PID).

If a query for the frequency of the reoccurrence of a certain event within a short time interval was defined as a relevant attribute in block 1, module "duplicates handler" 7 calculates the classes (reoccurring classes) which reoccurred within the defined time interval. The calculation is implemented by counting the frequency of reoccurring of various short-term IDs (ST-O-PID) for each long-term ID (LT-O-PID). The respective calculated reoccurring class is assigned to each long-term ID. For instance, long-term ID X was active for a total number of four times within different short-term IDs A, B, C, D. Long-time ID X is thus assigned to the reoccurring class no. 4. The short-term IDs are irrelevant for the further process and are discarded after formation of the reoccurring classes.

Further, module 7 polls the relevant attributes for each long-term ID as defined by the request from the static data database 80 which is located at the storage zone SZ (regularly at the data supplier DS). In response to the polling step encrypted attributes are delivered to module "attributes decryption" which decrypts the requested attribute values with the corresponding decryption key which is independent from the key used for decryption of the short-term IDs.

The decrypted attributes are forwarded to the static data filter 60 which generates segments for each unique combination of relevant attributes as defined by the request definition of module 1. The filter performs a dynamic adjustment of the accuracy for each attribute until each segment comprising at least five long-term IDs. The adjustment is executed on the basis of defined hierarchy levels wherein the preset minimum and/or maximum hierarchy level is considered at the filter 60. Besides a generalization of long-term records of individual IDs it is also possible to completely discard (suppression) individual data sets. The preferred ratio between generalization (less accurate information for the largest possible number of originally queried IDs) and suppression (more details for a possibly smaller number of originally requested IDs) can optionally be preset by the data aggregator.

In case of a group statistics service the static data filter 60 provides an aggregated segment information for a minimum number of different IDs. The long-term IDs used by the static filter 60 are discarded after the filtering process.

Afterwards, a response is generated at module 5 on the basis of the filter output. The response includes the respective response ID referring to the request ID, the segment definitions and the number of long-term IDs for each segment (for example segment 673 comprises 15 IDs). The response is displayed and/or stored and transmitted to the data aggregator.

The definition and usage of the aforementioned hierarchy levels is explained in the following. The static data filter 60 dynamically combines the concrete expressions (values) of individual attributes to classes. Each class includes a specific range of values. For generalization classes with a smaller range of values (more detailed information) can be grouped into classes with a wider range of values (=inaccurate information). Hierarchy levels specify how individual classes are nested within each other.

For instance, for the attribute "age" following hierarchy levels could be determined:

Level 5: n/a
Level4: <=49; >=50
Level3: <=29; 30-49; >=50
Level2: <=18; 19-29; 30-39; 40-49; 50-59; >=60
Level1: <=18; 19-24; 25-29; 30-34; 35-39; 40-44; 45-49; 50-54; 55-59; 60-64; >=65

Both classes and hierarchy levels must be fixed dependent of the service and can be adjusted only in exceptional cases. By the optional specification of a minimum and/or maximum hierarchy level within a request the accuracy/inaccuracy of an information can be dynamically specified for the best case (minimum level in the hierarchy) or worst case (maximum hierarchy level).

For instance, for the attribute "age" level 2 could be defined as the minimum level in the hierarchy, when information regarding age groups is requested which have an age difference of ten 10 years. In case of a combined request for more than one attribute a preset generalization of the attribute "age" may demand less generalization of another attribute (e.g. home area) to achieve the required minimum number of IDs for both attributes.

Furthermore, level 3 could be defined as the maximum level of the hierarchy if age information which is more inaccurate than one of the three classes <=29; 30-49; >=50 of level 3, has no relevance for the certain request. In such a case, the algorithm will not consider filtered data sets for which the age can only be generalized by level 4 or 5 to fulfil the anonymization criteria. Data sets of long-term IDs for which a generalization of the attribute age at level 4 or 5 is necessary will be discarded (suppression).

Figure 6:
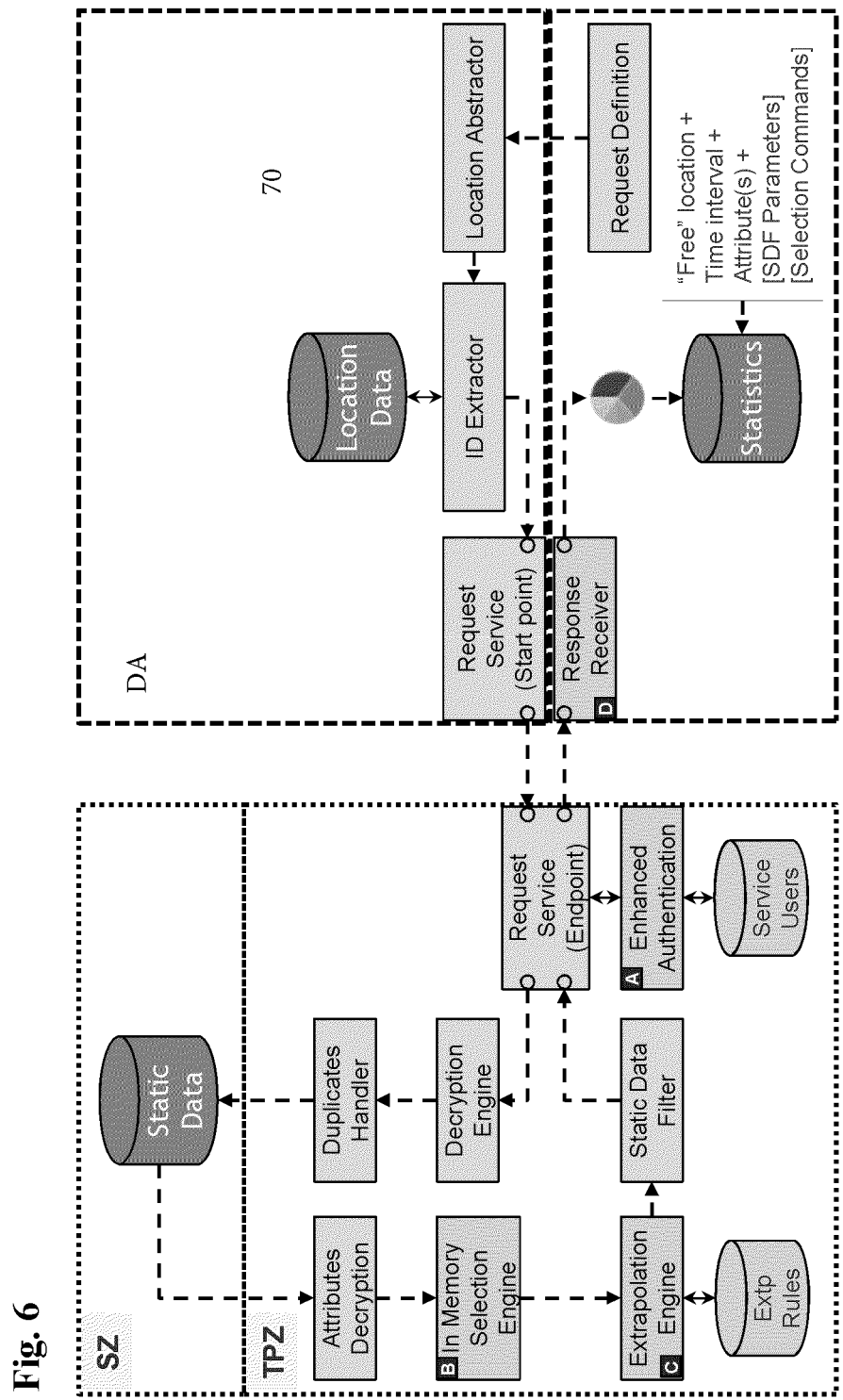
FIG. 6: the system of FIG. 5 expended by an additional selection and extrapolation logic.

The system according to FIG. 6 is basically the same as the system shown in FIG. 5. However, an additional selection and extrapolation engine is integrated which extrapolates the predetermined subset of static data before the filtering process. Furthermore, the embodiment of FIG. 6 provides an enhanced authentication module A which allows a more flexible setup of user rights, for instance selection commands are allowed and a definition of the response directions is possible if the response should be directed to a third party address.

Optionally, a preselection of processed data based on selection commands defined for the request is possible due to integration of the in memory selection engine B. For example, static data associated to IDs with home and/or work area to a certain location can be directly dropped.

The extrapolation engine extrapolate MNO sample view to total population based on various criteria, for instance actual market share at different home areas within age classes.

The additional response receiver D at the third party address enables separation of request and response premises to optionally allow "circle requests".

The invention claimed is:

1. A method for processing a plurality of event data sets collected within a system or network providing a service for subscribers, wherein
the event data sets include attributes containing time when an event took place, information about location where the event was triggered and type of event, and
event data sets are associated with an anonymized personal identifier identifying a subscriber who triggered said event in the mobile communication network, comprising:
collecting the plurality of event data sets, wherein each of the event data sets is related to an individual subscriber of the system/network and includes at least one attribute including a location attribute;
determining one or more first event data sets having identical or nearly identical values for an attribute of a first location, the one or more first event data sets being selected from the collected plurality of event data sets;
counting a number of first different subscribers associated with the first event data sets having the identical or nearly identical values for the attribute of the first location; and
determining the first event data sets as approved for being transmitted to an external device when the number of the first different subscribers exceeds a defined threshold;
determining one or more second event data sets having identical or nearly identical values for an attribute of a second location, the one or more second event data sets being selected from the collected plurality of event data sets;
counting a number of second different subscribers associated with the second event data sets having the identical or nearly identical values for the attribute of the second location;
determining the second event data sets as disapproved for being transmitted to the external device when the number of the second different subscribers does not exceed the defined threshold;
transmitting the first event data sets to the external device together with the associated anonymized personal identifiers; and
performing anonymization on the second event data sets, wherein
the performing anonymization further comprises deleting all personalized information included in the second event data sets, including the anonymized personal identifier,
the anonymization is achieved by deleting the personal identifiers from those event data sets which have been triggered within a geometrical region by insufficient different subscribers, and
if the collected event data sets are triggered by a sufficient number of different subscribers, the event data sets are sent to the external device together with the anonymized identifiers.

2. The method according to claim 1, wherein the performing anonymization further comprises discarding the second event data sets.

3. The method according to claim 1, wherein the second location attribute of the anonymized second event data sets by merging with the first event data sets is replaced by a generalized location attribute.

4. The method according to claim 1, wherein the first location and the second location are adjacent to each other.

5. The method according to claim 1, wherein the collection of the first event data sets or the second event data sets is triggered by an individual subscriber requesting one or more services of a mobile communication network.

6. The method according to claim 1, wherein each of the plurality of event data sets includes a timestamp attribute defining an event time,
wherein said timestamp is modified by rounding the timestamp and/or by adding time-offset which is randomly set.

7. The method according to claim 1, wherein the plurality of event data sets are combined in classes depending on their attributes.

8. The method according to claim 5, wherein the requested services of the mobile communication network comprise: a transmission of a short message, an incoming and/or outgoing telephone call and/or a data session, a handover event, and/or a self-initiated positioning event of a subscriber terminal device.

9. The method according to claim 7, wherein a third group of event data sets of the plurality of event data sets triggered by a third party are combined into a common class.

10. The method according to claim 1, wherein the performing anonymization on the second event data sets comprises merging the second event data sets with the first event data sets.

* * * * *